United States Patent Office 3,388,073
Patented June 11, 1968

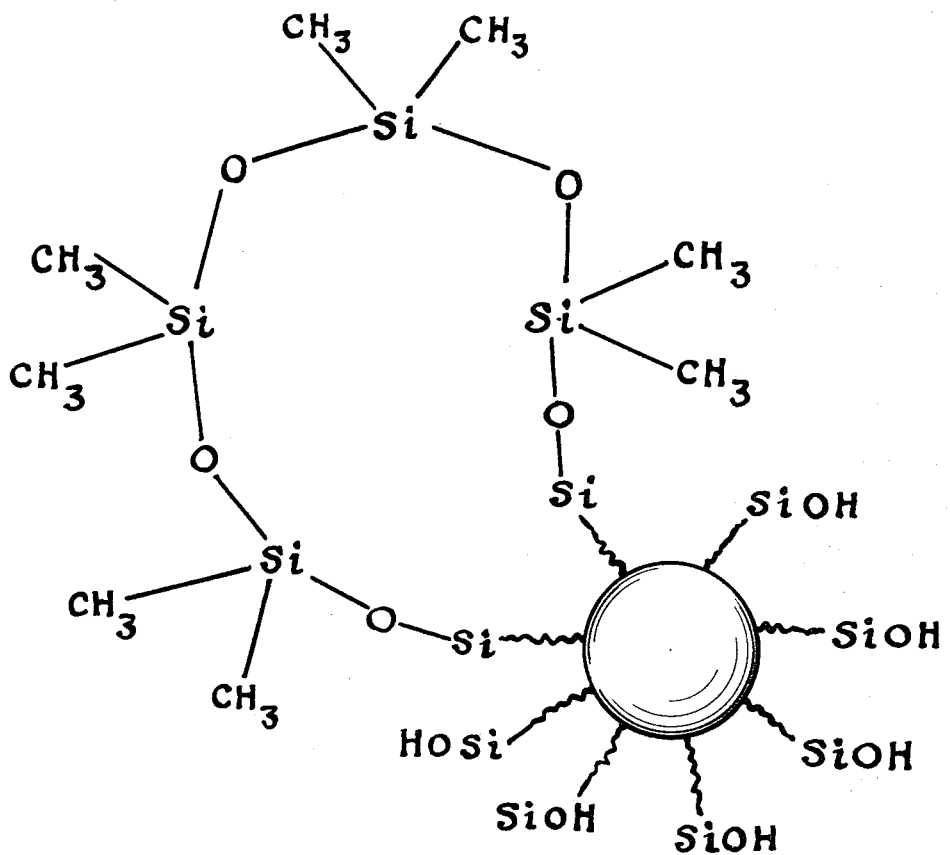

3,388,073
PROCESS OF DEFOAMING AND INHIBITING FOAM FORMATION IN AQUEOUS SYSTEMS
Elemer Domba, Chicago, Ill., assignor to Nalco Chemical Company, Chicago, Ill., a corporation of Delaware
Filed Dec. 16, 1963, Ser. No. 330,948
4 Claims. (Cl. 252—321)

ABSTRACT OF THE DISCLOSURE

The invention relates to novel defoaming compositions which may be broadly described as dialkyl substituted cyclic siloxanes which are composed of 4–16 membered rings interrupted by at least one siloxane bonded, dense silica particle, having an ultimate particle diameter of 5–150 millimicrons and a plurality of surface silanol groups. The compositions of the invention are extremely useful in defoaming a variety of systems where foaming presents a problem.

---

This invention is concerned with new compositions and their use in inhibiting and preventing foaming problems. More particularly, the instant invention relates to modified cyclic siloxane compositions, particularly valuable in inhibiting and preventing foaming of aqueous industrial processes.

It is known that many industrial systems are particularly susceptible to foaming problems even under mild conditions of agitation. In their more serious aspects these problems become a substantial drawback in not allowing full utilization of the particular equipment involved. Also, in many instances operating conditions are so altered by foam that considerable interference with the process itself is caused, with resultant low capacity and considerable economic loss. Serious foaming sometimes occurs, for example, when solvents or unreacted starting materials are stripped off either in vacuo or under atmospheric conditions, leaving behind the desired industrial product. For example, foaming of a considerable magnitude occurs when organic solvents used in preparing aqueous latex emulsions and/or unreacted monomer are removed by heat distillation, vacuum flashing, steam stripping or through other concentration techniques. Similarly, uncontrolled foaming at various steps in a papermaking process can cause considerable difficulties.

In order to counteract foaming problems of the types discussed above and others, it is oftentimes necessary to resort to chemical treatment to both abate the existing foam and prevent its reoccurrence.

However, many of the chemical treatments are limited in their application insofar as only one of the aforementioned effects takes place. That is, either immediate foam abatement occurs but without continuing foam prevention, or a treatment will provide continuous foam protection but is of no great use in dissipating already formed foam. Therefore, in many instances it is necessary to resort to at least two or more specific chemicals acting as adminicles to one another in order to achieve both foam abatement and foam inhibition in a system under treatment. However, this resort to multi-component treatment in order to achieve the required scope of activity often leads to further problems such as dispersibility of the compounds both in each other and in the particular system to be controlled. In addition, costly time and manpower must be spent in compounding these multi-component anti-foam treating compositions.

Another serious disadvantage of prior art compositions is their inability to be applied generally in a wide variety of industrial systems and processes. For example, organo-silicone condensation products or linear organopolysiloxanes, such as silicone and silicate polymers, while possessing good foam depressant or antifoam activity in certain media are relatively less active in other environments such as in aqueous foamable systems. Also, the above compositions and particularly silicones are costly, and often economics dictate use of certain other substances.

Many other disadvantages are involved in the use of prior art antifoam treatments. Some of the substances break down chemically and physically. These products of degradation may debilitate the parent active component or cause foaming problems due to their own foam encouraging properties.

Other antifoam compositions cannot be employed in certain areas due to the fact that they are quickly adduced from the area which needs control such as by heat distillation, or have little or no dispersibility, much less permanent dispersibility in the medium to be treated.

Lastly, many defoaming or foam-inhibiting substances must be employed in relatively large amounts to give effective control, or else cause difficult process control problems because they are ineffective unless added within certain critical limits.

It would, therefore, be a beneficial advance in the antifoaming art if a single substance could be found which is relatively general in its application, has good chemical and physical stability, excellent dispersibility or solubility in the environment to be treated, and yet need only be applied in relatively low amounts to give effective control. It would be an extreme advantage to the art if an antifoam substance could be discovered which may be usefully employed, particularly in troublesome aqueous systems which have a strong tendency to foam, such as aqueous latex emulsions and in various aqueous systems such as those used in processing paper pulp and the like.

It therefore becomes an object of the invention to provide stable, easily dispersible antifoam compounds which have rather general application, without recourse to other antifoam aids.

Another object of the invention is to provide novel compositions of matter which may be used to simultaneously defoam and inhibit foam in widely variable processes.

A specific object of the invention is to provide siliceous type compounds which may be used in aqueous systems particularly susceptible to foaming problems such as aqueous latex emulsions, paper pulp streams, etc.

The invention will be better understood by reference to the drawing which consists of an idealized representation of one specific compound falling within the scope of the invention.

In accordance with the invention, a novel class of compounds have been discovered which are admirably suited for use in defoaming and in foam inhibition activities. These new compounds may be used as antifoam agents without resort to combination with other ingredients and may be used in a wide variety of industrial processes which are accompanied by foaming problems. In general, these antifoamers are dialkyl substituted cyclic siloxanes composed of 4–16 membered rings interrupted by at least one siloxane bonded dense silica particle having an ultimate particle diameter of 5–150 millimicrons and a plurality of surface silanol groups. These products find use both as defoaming agents, that is, in abating a system already in a foaming state or in inhibiting or preventing foam formation before such condition occurs. Both roles may, of course, be performed simultaneously.

The above described novel compositions are prepared by a specific method which will be described in more detail below. The reactants, however, are well-known materials and need little elaboration. The first reactant is a silica particle having reactive surface silanol (—SiOH) groups. These siliceous materials may be either agglomerated, that is, joined in groups or clusters through an Si—O—Si type of bonding or may exist as discrete, non-aggregated silica particles. In any case, whether agglomerated, discrete or even bonded by some type of hydrogen bonding or electrostatic type linkage, the ultimate or individual particle size of these silica reactants ranges from about 5 to about 150 millimicrons in terms of average particle diameter. Greatly preferred materials are discrete, dense, non-aggregated particles of silica, or those capable of becoming discrete in nature under reaction conditions.

The silica may be chosen from a variety of well-known forms of silica. For example, a precipitated silica may be used, as for example, one prepared by peptizing a colloidal silica sol. Other suitable silica reactants are silica aerogels. These are silicas which are colloidal in nature and are generally prepared by replacing the water of a silica hydrogel with a low boiling organic liquid, miscible in water, followed by heating the resultant product in an autoclave above the critical temperature of the liquid. A particularly preferred type of silica reactant is a fume silica. This is a silica capable of being put into colloidal form, which is obtained by burning silicon tetrachloride and collecting the resulting silica smoke. A similar product may be obtained by burning a tetraorthosilicate at extremely high temperature. In any case, any silica particle may be used which has sufficient reactivity to form siloxane bonds through reaction of silanol groups existing on the surface of the particle. Suitable silica particles not only have the above stated ultimate particle diameter size, but also generally have a large surface area of at least 20 m.$^2$/g. and usually in excess of 120 m.$^2$/g. The particle surface area may even run as high as 500–600 m.$^2$/g.

One specific silica substance having found particular utility as a reactant in producing the novel compositions of the invention is a commercial product sold under the trade name "Cab-O-Sil." This type of silica is almost substantially chemically pure silica, expressed in terms of $SiO_2$ and is made up of extremely fine, well-defined particles. This material is produced by a vapor phase hydrolysis process of heating silicone tetrachloride in a furnace at 1100° C. The individual separate particles of silicone dioxide which are formed almost instantly are collected in a cyclone. Table I below gives specific chemical and physical characteristics of this material.

TABLE I

Silica content (moisture-free basis)
percent__ 99.0–99.7
Free moisture (105° C.) _____do____ 0.2–1.5
Ignition loss at 1000° C. (excluding moisture) _____percent__ 0.2–1.0
CaO, MgO, Na$_2$O _____do____ 0.00
Fe$_2$O$_3$+Al$_2$O$_3$ _____do____ 0.01
Particle size range _____micron__ 0.015–0.020
Surface area (nitrogen adsorption)
sq. meters/gm__ 175–200
Specific gravity _____ 2.1
Color _____ White
Refractive index _____ 1.55
pH (4% aqueous dispersion) _____ 3.5–4.2
Oil absorption (Gardner method)
lbs. oil/100 lbs. pigment__ 150
Bulking value _____gal./lb__ 0.057

The other reactant involved in producing the novel antifoam compositions of the invention is a dialkyl dihalo silane. Preferred silanes are those having two lower alkyl radicals attached to the silicon atom. These lower alkyl radicals most preferably contain four carbon atoms or less. Thus, suitable silanes are dimethyl dihalo silane, diethyl dihalo silane, diisopropyl dihalo silane, dibutyl dihalo silane, methyl ethyl dihalo silane, methyl isopropyl dihalo silane, etc. The halo group may be chosen from among any of the halogens such as chlorine, bromine and fluorine. Most preferred are the dichloro derivatives. A reactant which has found special utility in preparing the antifoam compositions of the instant invention is dimethyl dichloro silane.

With more specific reference to the drawing, it is seen that cyclic siloxane rings are interrupted by a siloxane bonding type reaction with the silica particle through its reactive surface silanol groups. It is understood, of course, that the drawing is merely meant as an aid to an understanding of the invention and pictures only one of a variety of similar cyclic substances which are produced by reacting silica and a dialkyl dihalo silane. The cyclic siloxanes may be composed of a lesser or greater number of individual atoms in the ring, and specifically as few as four members, or as great as sixteen members. Likewise, the rings may be interrupted by more than one silica particle via siloxane bonding. Similarly, each silica particle may have one or more cyclic rings attached to its surface via chemical bonding. A very minor proportion of the silica particles may be joined by linear polysiloxane linkages. However, it has been determined that the vast majority of surface reaction upon the silica particles is in the nature of cyclic structures as represented in the drawing.

In order to form the compositions of the invention, special process conditions must be carefully followed. Specifically, the silica should be dissolved in aliphatic hydrocarbon or a paraffin oil such as mineral seal oil. The concentration of silica in paraffin may vary from about 1 to about 20% by weight. Also added are small amounts of water which aid in hydrolyzing the subsequently added dialkyl dihalo silane. The water content may be varied from about 1 to 10% by weight based on paraffin oil content. It is greatly preferred, however, that the amount of water added be exactly equal to the amount necessary for theoretical hydrolysis of the dialkyl dihalo silane reactant to an intermediate dimethyl silane diol.

The dialkyl dihalo silane is then added to the above mixture at a relatively slow rate. The amount of silane added may be varied from about 4 parts per 1 part of silica to about 1 part silane to 4 parts of silica. A typical reaction involves equal parts of silica and dihalo dialkyl silane.

The reaction itself should be run at less than about 40° C. and more preferably less than 35° C. In most cases, cooling is necessary to maintain the temperature within the above stated ranges because of the exothermic nature of the cyclic reaction. Due to the silane hydrolysis and release of hydro halide acid, such as hydrochloric acid, the pH of the reaction mixture is quite low during formation of cyclic siloxane rings attached to silica. It is important that both a low reaction temperature be maintained as well that the reaction be effected at a pH at least below about 4.0 and most preferably less than 1.0. If either of these variables are not followed as suggested, either the cyclic structures are not obtained, or silica is not caused to enter into the ring structure itself.

The addition of dialkyl dichlorosilane may vary from about ¼ hour to about 6 hours, but generally is completed within about ½ hour to about 2 hours. Depending upon the batch size, the rate of addition of dialkyl dihalo silane may vary from about ½ to about 100 lbs. per hour. During the whole of the reaction, rapid agitation of the reaction mass should be carried out. Impeller peripheral speeds of at least 1000 feet per minute have been employed with good success. After addition of the silane is completed, further mixing may be effected, if desired.

After the reaction is completed, the temperature may be raised to strip off hydrohalide acids and low boiling residues. This distillation is preferably accomplished under vacuum. Temperatures as high as 130–160° C. under vacuums of 5–50 mm. Hg for 1–6 hours are generally sufficient to attain this objective.

The following example illustrates a typical preparative technique useful in synthesizing the antifoam compositions of the invention.

Example I

To a 20 gallon glassed-steel reactor equipped with a variable speed drive agitator (300–500 r.p.m.), baffle, and a 7.9 square foot cooling jacket, was added 100 pounds of mineral seal oil, 3 pounds of water, and 10 pounds of fume silica. The batch was allowed to mix well for at least 15 minutes. The peripheral speed of the impeller imparting agitation to the batch was at all times at least 1000 feet per minute.

Cooling water is then introduced into the jacket, and 10 pounds of dimethyl dichlorosilane added over a period of approximately ½ hour. Cooling maintained the pot temperature from about 25° to 35° C. Any HCl gas evolved was collected by a counter-current water scrubber attached to the system. The mixture was then allowed to mix for two additional hours at 25°–35° C.

Vacuum was then applied very slowly until a 15–20 mm. Hg level was attained. The pot temperature was raised slowly to 140° C. and maintained at 140° C–150° C. under the above vacuum for three hours. The batch was then cooled and drummed. The finished product had a pH of 4–5, and was a clear, thixotropic type material.

The reaction products of the invention may be isolated from the paraffin solvent and employed as foam inhibitors and foam preventers in 100% active form. It is greatly preferred, however, that the cyclic siloxane-silica compounds be employed directly as processed in form of dispersions in aliphatic hydrocarbon oils. These latter oils may include mineral seal oil, kerosene, various light aliphatic fuel oils, gas oils, paraffin waxes, and the like. A preferred composition comprises 1–40% by weight of active antifoam dispersed in one or more of the above aliphatic oils or others.

In many instances emulsifying agents, such as polyoxyethylene glycols and polyalkylene glycols, for example, those marketed under the trade names of "Ucon" and "Carbowax," may be added to the reaction products of the invention or to their formulations in aliphatic hydrocarbon oil extenders. Compounds other than emulsifiers and extenders, such as dispersants and the like, may also be added to the reaction products of the invention in order to obtain formulated products of the desired physical characteristics in order to overcome feeding problems, etc.

The cyclic siloxane silicas are useful in a wide variety of industrial processes which require control of foaming problems. Among these processes, the compositions may be used in the following: the feedwater of boilers such as wayside boilers; for use in non-frothing emulsions used in leather tanning, the textile industry, etc.; in cutting oils; for incorporation into dye baths, dye pastes, discharge pastes and the like; to prevent foaming and resultant loss of liquid from a circulating cooling system; in fermentation processes; in cooking with fats and oils; in lubricants; and in single or multiple-effect concentrators containing aqueous, organic or inorganic type materials and the like.

Besides use in the above varied processes involving a wide scope of environmental conditions, the compositions of the invention are also active in controlling foaming of latex emulsions used for paints or coatings and in inhibiting and controlling foam in pulp and paper manufacture such as in a kraft process. The compositions have found particular use in inhibiting foam normally occurring during preparation and concentration of rubber latexes via rubber latex emulsion polymerization of such monomers as styrene, acrylonitrile, butadiene, isobutylene, isoprene, chloroprene and mixtures of any of the above. Soaps and surfactants used in the polymerization step causes severe foaming difficulties in absence of use of the defoaming and antifoam additives of the invention. Paper coatings such as butyl latex or polyvinyl chloride latex may likewise be treated during their production, with the instant antifoamers.

When used to control and inhibit foam in industrial areas, addition of as little as 1 p.p.m. of the compositions of the invention gives good foam inhibition and foam prevention. As much as 50 p.p.m. of antifoam may be used with a preferred range being between 1 and 100 p.p.m., and with the most preferred range being 1–25 p.p.m.

The compounds of the invention are effective antifoamers over a wide range of pH conditions and under almost any combination of pressure and temperature conditions. The compositions when used as antifoam agents should preferably be added as close as possible to the source of the foam. For example, to inhibit foam created under conditions of distilling off unreacted monomer and/or solvents used during production of aqueous latex emulsions, as the type used in the paint and coating industries, the antifoam composition should be added directly to the reaction mass being processed, whereby it is actually present during the concentration step. Likewise, in a papermaking operation, since foaming difficulties occur in deckers, in black liquor separation equipment, in the screen boxes and the cylinders of a cylindrical papermaking machine, in the headbox of a Fourdrinier papermaking machine, etc., it is preferred that antifoam application be made in those areas. The antifoam compounds of the invetnion may also be added to the feed box or to the screen pump, screens, or showers of the cylinder machine, or to the fan pump, showers or wire pit of the Fourdrinier machine. When used for antifoam control in pulp and paper manufacture, as little as 0.1 lb. of active antifoam per ton of pulp based on the weight of the dry fiber gives good results. As high as 20 lbs./ton may be used in extremely difficult foaming areas. In a preferred practice, between 0.2 and 2 pounds of chemical are used per ton of fiber stock.

The compositions of the invention may be used for a variety of use applications other than to inhibit foam formation. As just one example, it has been determined that the cyclic compounds are useful in preventing pitch deposition upon paper making equipment.

EVALUATION OF THE INVENTION

In order to determine the effectiveness of the antifoam compositions of the invention, a laboratory procedure was devised to simulate industrial conditions and test the efficiency of the cyclic siloxane products of the invention.

The following test was set up in order to determine the antifoam activity of the compositions of the invention with respect to paper pulp stock. A test stock was first prepared as follows: to 860 ml. of water containing 224 mg. calcium chloride, were added 140 grams of 16% total solids black liquor and 50 mls. of a 1% aqueous solution of a sodium salt of a rosin acid. 58 mls. of this solution were then added to a 1 gallon jug. 18 grams of kraft pulp were pulped in 1,000 mls. of water and added to the jug containing the black liquor mixture. Stock was then made up to 1 gallon with tap water, well shaken and employed for the following test. In this test, 6 liters of the above paper stock containing pulp were placed in a glass pipe, 6" diameter and 18" in height. The stock was recirculated through a 1½" diameter hose by means of a pump which was running at 3,450 r.p.m. The amount of antifoam necessary to prevent foam buildup during the recirculation was then determined.

The composition of Example I was then tested for antifoam activity in the above discussed recirculation test. This product had excellent activity in preventing and inhibiting foam buildup and in deaerating the paper stock within the aforementioned limits of chemical application per ton of paper stock. Specifically, after 15 seconds' time, foam height of only about 3 cm. was noted upon application of 1.5 p.p.m. of the composition of Example I to the glass pipe containing rapidly agitated paper stock. On the other hand, in a blank run involving no antifoam the foam spilled over the top of the pipe before the 15 second period elapsed.

Reaction products of the invention using silicas and dialkyl dihalo silanes other than the specific reactants shown in Example I were also tested by the above scheme and gave equally good results.

In field runs excellent foam control was achieved by addition of the product of Example I (20% active material) to black liquor being separated from pulp. This material was applied at a rate of 40–45 ml./min. A prior art competitive hydrophobic silica containing no cyclic siloxane structures gave passable control only at 80 ml. per minute when run at approximately the same active solids level.

The invention is hereby claimed as follows:

1. The process of defoaming and inhibiting foam formation in aqueous systems which normally tend to foam, which comprises the steps of adding to said systems from 1 to 100 p.p.m. of a composition comprising a dialkyl substituted cyclic siloxane which contains not more than 4 carbon atoms in an alkyl group and is composed of 4–16 membered rings interrupted by at least one siloxane bonded, dense silica particle having an ultimate particle diameter of 5–150 millimicrons and a plurality of surface silanol groups, the said composition having been formed by the step of reacting, in the presence of an aliphatic hydrocarbon, a silica particle having a reactive surface silanol groups and ultimate particle diameter of 5–150 millimicrons and a dialkyl dihalo silane for from one-quarter to about six hours whereby a cyclic siloxane is formed, said reaction being carried out at a pH of less than 4.0 and at a temperature less than 40° C.

2. The process of claim 1 where the aqueous system is a paper pulp stock.

3. The process of claim 1 wherein said cyclic siloxane is a dimethyl substituted cyclic siloxane.

4. The process of claim 1 wherein said silica particle is fume silica.

References Cited

UNITED STATES PATENTS

| 2,786,042 | 3/1957 | Iler | 252—313 |
| 2,802,850 | 8/1957 | Wetzel | 117—100 X |
| 2,938,009 | 5/1960 | Lucas | 117—100 X |
| 2,993,809 | 7/1961 | Bueche et al. | 117—100 X |
| 3,076,768 | 2/1963 | Boylan | 252—358 |
| 3,207,698 | 9/1965 | Liebling et al. | 252—358 |

FOREIGN PATENTS

| 544,234 | 7/1957 | Canada. |

LEON D. ROSDOL, *Primary Examiner.*

R. D. LOVERING, H. B. GUYNN,
*Assistant Examiners.*